Patented Sept. 11, 1951

2,567,362

UNITED STATES PATENT OFFICE 2,567,362

METHOD OF EXTRACTING PIGMENTS FROM PLANTS

Sophia S. Berkman and Boris S. Berkman, Chicago, Ill.

Application May 3, 1945, Serial No. 591,662

8 Claims. (Cl. 260—236.5)

This invention[1] relates to compositions prepared from plants, particularly to compositions including or constituted by the pigment units thereof, which include physiologically and otherwise active ingredients such as chlorophyll, carotene, etc.

This application is a continuation-in-part of our copending application Serial No. 534,168, filed May 4, 1944, now abandoned.

Various processes have been proposed heretofore for isolation of plant ingredients, but so far as we are aware no process prior to our invention has been proposed or operated to obtain these constituents in substantially the same form as they occur in nature. Without exception, so far as we are aware, such processes have produced a profound alteration in the pigment system of the plant and frequently in the individual pigments or constituents themselves. In addition, the processes have been laborious, time-consuming, and costly, particularly with respect to the solvents and other reagents used. Some processes have heretofore proceeded by drying the plant or plant product before proceeding with the treatment thereof with solvents or other reagents. The disadvantage of such processes is that such drying may effect coagulation or displacement of proteins or other changes in other valuable units contained in the plant structure, and such changes then permit further destruction of pigments or other ingredients in the subsequent steps.

Where either fresh or dried plants have been employed heretofore, the conventional steps taken have been:

(a) To subject the raw material to one or more organic solvents, such as methanol, acetone, benzene, ethylene chloride or carbon disulfide, alcohol, ether, etc. or (b) To subject the raw material to aqueous salt solutions.

In organic or aqueous salt solutions, according to steps (a) or (b) the pigment system undergoes undesirable chemical changes such as hydrolysis, alcoholysis or allomerization. In addition, the use, particularly, of fresh materials, say, fresh leaves or raw vegetables such as spinach, carrots, etc. which are bulky in nature and have a high water content, has necessitated the use of large quantities of salt solutions or organic solvents which are difficult and costly to recover.

We believe that we are the first to ascertain in accordance with our invention, that plants include "active pigment units" which occur in a colloid-electrolyte system which is anisotropic, and in which the "active pigment units" are in the dispersed phase, the dispersion medium consisting of water, electrolytes and cytoplasmic protein, and that we are the first to isolate such "active pigment units."

The term "active pigment units" as employed herein is intended to define the pigment units of plant structures prepared in accordance with our invention and which include such pigment units as found in the plant substantially unchanged. These active pigment units as we isolate them in accordance with our invention, as we have demonstrated, are practically identical with such units occurring in the living plant structure, in the important factors: ingredients, spatial configuration, and compactness in structure. We have found in accordance with our invention that on these factors depend the potential activity and stability of these units.

We believe that we are also the first to ascertain in accordance with our invention that these active pigment units are photo- and oxy-stable. This stability appears to be due to the presence of the lipoid and chromo-protein matter as stabilizers contained therein. Chlorophyll, carotene lycopene and xanthophyll occurring in plants are in themselves all unstable materials, as we have demonstrated by absorption spectra comparisons of fresh and dried leaves.

Prior processes have overlooked these important facts and the methods employed to obtain materials from plant structures, such as organic solvents or salt solutions, have resulted in decomposition of the photo- and oxy-stabilizers so that the remaining units were easily subject to attack and were decomposed. In addition, chlorophyll may be easily changed into a chlorophyllide by alcoholysis. We have found in accordance with our invention that chlorophyll itself is an amorphous substance, whereas the chlorophyllides which have been produced heretofore and loosely called "chlorophyll" are crystalline bodies. In the following equation, alcoholysis by ethyl alcohol produces such crystalline ethyl chlorophyllide:

[1] The invention described herein is subject to a non-exclusive license referred to in our copending application mentioned below to the Government for governmental purposes.

(Chlorophyll)      (Crystalline ethyl chlorophyllide)

Chlorophyll has never been isolated, so far as we are aware, and this formula has been constructed theoretically from observance of the decomposition products.

Similarly, when chlorophyll is heated with alkalies at elevated temperature, as heretofore proposed, the carboxyl groups are broken off, leaving ethiophyllin. Further, magnesium occurring in the chlorophyll molecule, as shown above, is removed when it is treated with acids whereby phytins occur. Thus, chlorophyll (a) and (b) treated with acid gives pheophytins a and b. Chlorophyll treated with an acid and then an alkali gives phylloporphyrin.

We have also found that in organic solutions containing water, the phytol ester group of chlorophyll is hydrolyzed to the free carboxyl. Further, we have found that upon saponification of chlorophyll, the easily saponifiable methyl ester groups become hydrolyzed. Other profound changes occur on standing of chlorophyll in alcoholic or other organic solutions, termed allomerization.

Carotene, consisting of a long acyclic chain of carbon atoms joined in an uninterrupted sequence of conjugated double bonds oxidizes and bleaches readily. Lycopene, which is an isomer of carotene oxidizes and bleaches more readily than carotene. Xanthophyll is a carotenoid pigment closely associated with carotene and is also unstable under oxidizing conditions.

An important object of our invention, accordingly, is to provide a composition of "active pigment units" and other compositions derived from fresh plant materials isolated in substantially unaltered form and having properties never heretofore obtained, so far as we are aware. Another object of the invention is to provide a composition of "active pigment units" having physiological activity. Another object of the invention is to provide such a composition constituting non-toxic food colorants. Another object is to provide such a composition serving as oxidation catalysts. Another object of the invention is to provide in substantially unaltered form specific constituents of the "active pigment units," as well as other specific substances from the remainder of the colloid-electrolyte system. Another object of the invention is to provide a simple process for securing such "active pigment units."

We have found in accordance with our invention that these prior art processes as mentioned above, effect profound changes in the plant pigments resulting in the removal of certain protective agents which our experiments show constitute important factors in effecting oxy- and photo-stabilization.

The invention comprises the novel products as well as the novel processes and steps of processes according to which such products are manufactured, the specific embodiments of which are described hereinafter by way of example, and in accordance with which we now prefer to practice the invention.

Our invention includes the isolation of valuable photo- and oxy-stable "active pigment units" which are inherently stable against the action of light and oxidation. It also includes the separation from such units of valuable constituents thereof in substantially unaltered form. It also includes recovery of important constituents such as proteins from the colloid-electrolyte system. In accordance with our invention, these units and the other products are produced by economical means which preserve the natural character of the product.

In order to illustrate the occurrence of the "active pigment units" in a system such as described, we have included herewith a drawing, of which.

The figures are not intended to represent the actual system or structure of the unit as found in the plant. We are not sure that the units have the shape shown and no attempt is made to show the relative quantities of the materials constituting the units. We do know, however, in accordance with our invention and as shown in the figures, that the "active pigment units" comprise the substances which are indicated in the figures and that they are surrounded by a medium which is constituted substantially of the substances indicated thereon.

Figure 1:
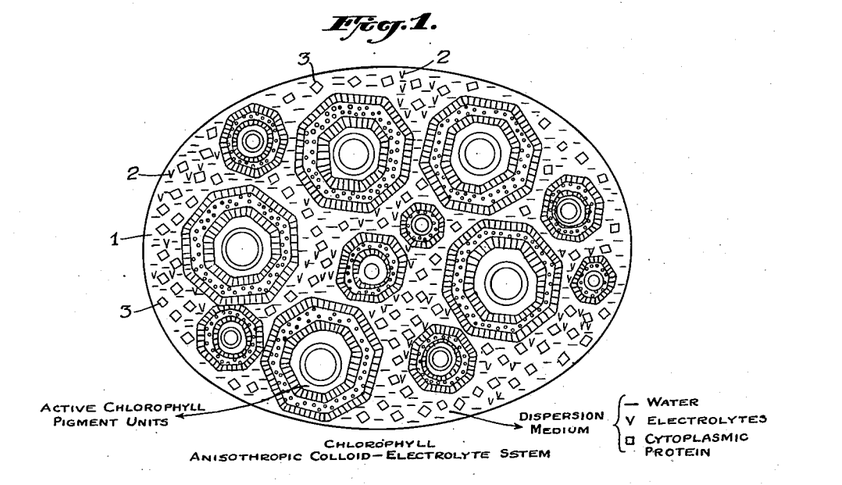
Fig. 1 represents a diagram of the submicronic dispersion of such active pigment units as part of an anisotropic colloid-electrolyte system, here shown as a chlorophyll-containing system, derived from spinach.
Figure 2:
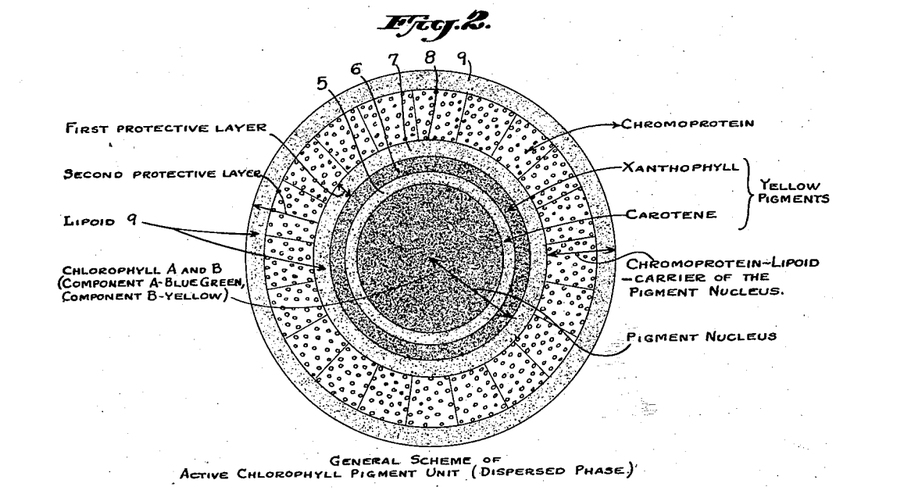
Fig. 2 is an enlarged schematic view of a single "active pigment unit" here shown as substantially circular.

Referring now to the drawing:

Fig. 1 shows a colloid-electrolyte system of chlorophyll including water, designated by the numeral 1, electrolytes designated by the numeral 2 (such as ascorbic acid, etc.) and cytoplasmic protein designated by 3, molecularly dissolved. In this dispersion medium, the "active pigment units" are dispersed. As shown in Fig. 2, these units, here shown as circular, are made up of a pigment nucleus 4, composed of chlorophyll a which is blue-green and chlorophyll b which is yellow-green, surrounded by a pigment layer 5 consisting of carotene, which is orange-yellow, which in turn is surrounded by a layer 6 consisting of xanthophyll, which is yellow. Surrounding the xanthophyll layer 6 is a lecithinoid or other lipoid protective layer 7. Surrounding this layer is a second protective layer designated by the numeral 8 which is chromo-protein, which acts as the carrier of the pigment nucleus and lipoid. Around this layer is an external layer 9 which is also a lipoid covering.

Figure 3:
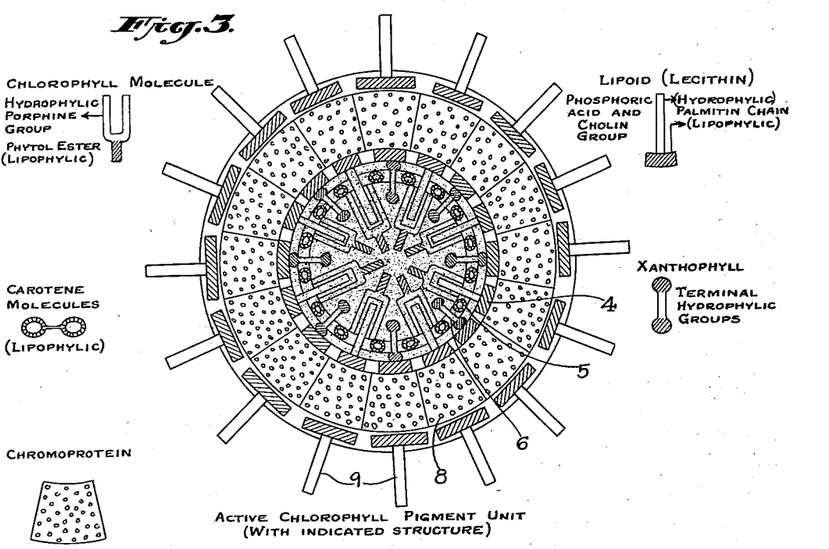
Fig. 3 is a diagrammatic view similar to Fig. 2 with a schematic view of the spatial arrangement of groups of molecules making up the "active pigment unit."

As shown in Fig. 3 the chlorophyll molecule is shown as Y-shaped with the stems arranged radially with respect to the unit and the upper portion of the Y embraces the stem of the lipoid unit 7, described more particularly below. The carotene nucleus 5 is shown in the form of linked balls with the xanthophyll structure 6 also shown as linked balls, the link of the xanthophyll shown as crossing the link of the carotene group, and arranged radially with respect to the pigment unit. The lipoid 7 is shown as a T-shaped structure with the stem of the T consisting of phosphoric acid and cholin groups which are hydrophilic and arranged radially and crossing the links of the carotene group intermediate the crossing of these links by the xanthophyll group. The head of the T is a palmitin chain group which is lipophilic. The Y-shaped chlorophyll molecule is shown with the stems radially arranged with respect to the unit and the upper portion of the Y embraces the stem of the lipoid 7.

The chlorophyll 4 is shown as a Y-shaped molecule in which the stem of the Y is the phytol radical which is lipophilic and the upper portion of the Y is the porphine radical which is hydrophilic. The chromo-protein 8 is shown as truncated spherical triangles arranged radially around the lipoid structure 7. The exterior lipoid coating 9 is shown with the same structure as the lipoid 7 with the stems of the T's also arranged radially around the chromo-protein layer, the stems pointing in the reverse direction from the stems of the layer 7.

Figure 4:
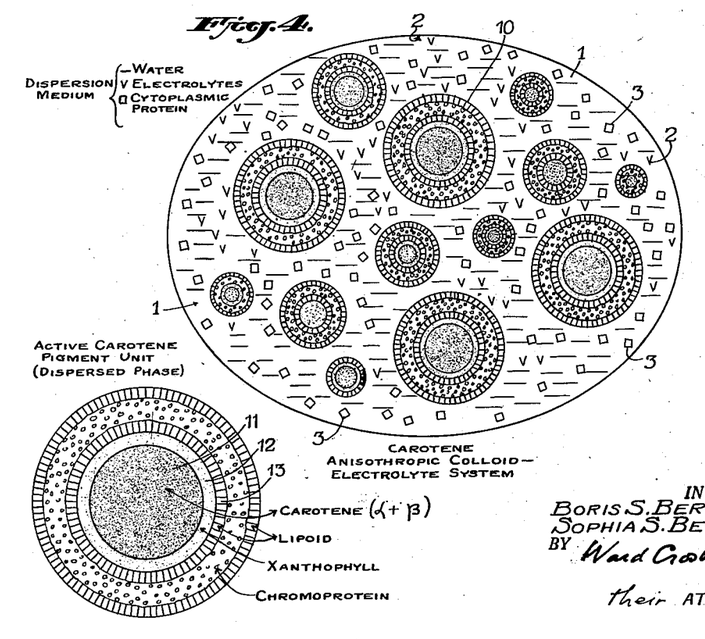
Fig. 4 is a diagram of the submicronic dispersion similar to Fig. 1 but showing a dispersion obtained from carrots.

As shown in Fig. 4 the anisotropic colloid electrolyte system derived from carrots shows water 1, with electrolytes 2, cytoplasmic protein 3 in which are the carotene pigment units 10 which are also "active pigment units" as herein defined. The carotene group consists of a central nucleus 11 composed of alpha and beta carotene surrounded by a xanthophyll layer 12 covered by a layer of lipoid 13, which in turn is covered by a chromo-protein layer 14. The chromo-protein has a surrounding outer layer 15 of lipoid.

These "active pigment units" in the hydrosol systems described are of submicronic size and with the dispersion medium constitute the extraced juices of plants. As stated above, the figures represent the dispersion of "active pigment units" of chlorophyll, such as derived from spinach, and of carotene, such as derived from carrots. It will be understood, of course, that different plants or plant products may have, as compared with one another, differently constituted "active pigment units," but in general we have found that these units such as shown in the figures include one or more pigments protected by protein and lipoid layers.

Our novel method of obtaining a colloid-electrolyte system of the type shown in the drawings includes the following:

The raw material—such as fresh leaves, raw vegetables, fruits, or the like—is first carefully cleaned and washed to rid it of surface dirt and other foreign matter. The cleaned material may be fragmented by chopping or scraping, and then is ground in a porcelain mortar, in a porcelain ball mill, or in a colloid mill, with a relatively small quantity of distilled water, varying preferably from about one-half of the weight of the material up to about an equal weight with that of the material. There results, ordinarily, a deeply colored aqueous extract or hydrosol, which is the hydrosol, examples of which are shown in the drawings.

The hydrosol is freed from suspended matter by filtration, preferably through paper under pressure and/or suction, followed by passage of the hydrosol through a fritted glass filter. We have observed that a hydrosol thus filtered exhibits anisotropy.

The next step involves the separation of the "active pigment units" from the dispersion medium—water, electrolytes and cytoplasmic protein. We accomplish this as follows:

(a) *Centrifugation.*—We may employ centrifugation of the hydrosol obtained above in order to separate the "active pigment units." The centrifugation may be carried out by means of various types of centrifugal machines. So-called supercentrifuges may be employed, as may other forms of centrifugals. We have successfully separated "active pigment units" from hydrosols containing the same, by using a large laboratory centrifuge at a rotor speed of about 2900 R. P. M., generating a centrifugal force of about 1400 times gravity.

We may subject the filtered hydrosol to a single prolonged centrifugation, or to successive periods of centrifugation; the sedimented active pigment units being separated from the liquid portion. We prefer fractional centrifugation, because the operator thus is enabled to judge when a further period of centrifugation will not be warranted by reason of the small amount of sediment which we may expect to obtain. With each succeeding period of centrifugation the sediment obtained thereby is made up of "active pigment units" of rapidly diminishing particulate size; so that the weights of the successive sediments drop sharply.

The sediments separated from the respective centrifugates are the "active pigment units," examples of which are shown in the figures of the drawings. These units when dried are stable toward oxygen and light including sunlight, at least partly because of the removal, during the process, of extraneous materials, such as electrolytes, enzymes, coenzymes and the like.

The liquid portion of the original filtered hydrosol remaining after separation of the "active pigment units" is still slightly colored by reason of the presence therein of small amount of dispersed pigments, which are very difficult, if not impossible, to sediment by centrifugation alone. This centrifugate also contains cytoplasmic proteins and lipoids which are similarly difficult to sediment by centrifugation alone. These cytoplasmic proteins are present in the centrifugate in amounts sufficient to warrant their separation We, therefore, warm the liquid to a protein-flocculating temperature, preferably up to 55° C. and not ordinarily higher than 60° C., at which decomposition of the proteins may commence, and for a period preferably of at least one hour. Then we subject the liquid to centrifugation, whereby the protein is thrown out of solution as a flocculent precipitate, carrying with it a small part of the still dispersed pigment together with a small part of the still dispersed lipoid. The minor quantities of pigment and of lipoid may be separated from the flocculated protein—after low-temperature drying thereof—by suitable solvents, leaving white plant cytoplasmic protein as a by-product.

(b) *Novel electrodialysis.*—This is an alternative process. In this process we preferably employ collodion sacs as dialyzing membranes. Any suitable semi-permeable membrane known to the art, however, may be used.

It is common procedure to immerse one electrode in the liquid to be dialyzed, and the other electrode in the liquid—commonly distilled water—outside of the dialyzing membrane. Such dialysis tends to cause aggregation of dispersoids and deposit thereof on the first electrode. Our novel modified method of electrodialysis, suitable specifically for our colloid-electrolyte system, that overcomes this obstacle, is to immerse completely in distilled water a dialyzing sac, filled with the filtered hydrosol and stoppered or otherwise closed off, in a vertical position midway between two electrodes similarly positioned. Each electrode carries, fused into its lower end, a short length of platinum wire, foil, or sheet. The projecting platinum wires preferably are immersed in the distilled water so that only a short portion of each lies above a horizontal plane intersecting the lowermost portion of the dialyzing sac. In this manner the electric field—derived from an impressed E. M. F. of 110 volts D. C. at about 1.8 to about 2 amperes—is concentrated in the neighborhood of the most dependent portion of the dialyzing sac; the result of ultra-filtration in the electric field being that, at the end of a suitable period of dialysis, two sharply defined zones of liquid ordinarily appear within the sac, an upper zone substantially colorless and a lower zone deeply colored and containing the "active pigment units." The molecularly dissolved ingredients, such as proteins and electrolytes, pass during dialysis into the water outside the sac.

In the course of the electrodialysis, the distilled water, in which the sac is immersed, is renewed either at short intervals, say, of 20 to 30 minutes; or the distilled water is added at a constant low rate, its level being maintained by means of a siphon or other suitable constant-level arrangement.

The length of the period of dialysis is a matter of choice, depending principally upon the source of the hydrosol and the concentrations and electrophoretic mobilities, respectively, of the dispersoids therein. When the dialysis is carried out in the preferred manner that we have described above, we ordinarily continue the dialysis until the upper border of the colored zone in the dialyzing sac becomes quite sharply defined, and attains a substantially fixed level. In a typical example of electrodialytic separation of such units from spinach leaves, the period of dialysis was about eight hours.

Upon termination of the dialysis, the "active pigment units" in water may be pipetted from the remainder of the liquid in the sac, or may be separated therefrom in any other suitable manner. When zoning has occurred, as we prefer, then, the "active pigment units" have been concentrated into a small volume of water.

The "active pigment units" from either of the above processes are dried at a low temperature, preferably in vacuo, to form an amorphous solid. As dried, the "active pigment units" may be used, without further treatment for purposes as described below. This drying comprises the next step given below in our preferred practice of our process.

DRYING THE PIGMENT UNITS

Unless our novel pigment units are used in their freshly formed, wet state, the next step in our method is to dry the active pigment units, since they are subject to bacterial spoilage if maintained in their wet state at room temperature for any considerable length of time. Various methods known to the art for the drying of thermolabile biological products may be used, provided they do not involve contamination of the material, nor the mixing of the material with a drying agent such as anhydrous sodium sulfate. We prefer to desiccate our "active pigment units" by subjecting them to a current of cool, dry air, or by drying them in vacuo at a temperature of 30° C., or below. All of the dry residues are amorphous.

Once our "active pigment units" have been brought to dryness, they are no longer dispersible in pure water; but they are dispersible in a colloidal state in serums which contain suitable amounts of proteins and lipoids. We have found, for example, that our dry pigment units are readily dispersible in mammalian blood serum and plasma.

Our dry active pigment units are all uniform in qualitative makeup, in so far as each is an aggregate of plant pigment, chromo-protein and lipoid. But they may differ from one another rather sharply as to the relative proportions of these components, depending, for example, upon their source or upon whether they have been separated by electrodialysis or by centrifugation. The "active pigment units" from dialysis differ from the dried centrifugal units in that the former contain only a fraction of the lipoid to be found in the latter. The former, moreover, are decidedly lower in pigment and higher in protein than are the latter. The differences in such composition, as well as differences in composition between successive fractions derived by fractional centrifugation of a single hydrosol—all of which will appear in later specific examples of the practice of our invention—lead us to believe that our various novel "active pigment units" are physical unions of pigment, chromoprotein and lipin, the several components being held together either by physico-chemical, or surface, or adsorption forces.

Our dry "active pigment units," when stored in suitable containers, have exhibited no apparent change upon long standing.

The separation of pigments from our dry "active pigment units" may be effected as follows:

SEPARATION OF INDIVIDUAL PIGMENTS FROM THE DRY PIGMENT UNITS

The separation of individual pigments from our dry "active pigment units" may be carried out in a number of ways. The first of these two methods involves the selective-solvent separation of individual plant pigments in a mixture thereof; while the second method involves chromatographic adsorption of individual pigments on solid adsorbent media.

In the following examples, we describe embodiments of compositions which we now prefer for practising our invention, together with methods for obtaining same. These examples are illustrative and the invention is not limited thereto except as indicated in the appended claims.

*Example I*

179 grams of fresh spinach leaves were carefully cleaned of extraneous material, chopped finely, and ground in a porcelain mortar, with 150 cc. of distilled water at room temperature. The deeply green colored aqueous portion was separated from the solid residue (cake) by filtration through paper, and the filtrate thus obtained was passed through a fritted glass filter to obtain a chlorophyll hydrosol containing the "active pigment units" as the dispersed phase while the cytoplasmic protein and the dissolved electrolytes constitute the dispersion medium. The volume of this hydrosol was 110 cc., and contained 5.1 grams of solids.

The obtained hydrosol of spinach chlorophyll is electro-negative, has a pH—6.47. It is a colloid-electrolyte system, in which a dynamic equilibrium is maintained between the colloidally dissolved pigment units and the molecularly dissolved cytoplasmic protein—lipin. This hydrosol when brought in a slight motion by stirring, rotating or allowing to flow, exhibits "Streak or Schlieren" phenomenon because its elongated particles orient themselves parallel to the streaming lines and due to different reflection of light from the particles the liquid acquires the appearance of a liquid "moiré" silk, as observed in vanadium pentoxide or benzopurpurin sols. In polarized light the pigment units of the dispersed phase show double refraction and double adsorption (dichroism).

The existence of a dynamic equilibrium between the colloidally dissolved compact chlorplastic protein-lipin complexes containing the pigment nuclei and the molecularly dissolved cytoplasmic protein-lipin loosely bound complexes permits the removal of the latter either on fractional centrifugation or by ultrafiltration in the electric field (type of electrodialysis) as above described.

Thus, a portion of the spinach chlorophyll hydrosol was subjected to fractional centrifugation for four periods of one hour each, with a centrifugal force of the order of 1400 times gravity. After the first period of one hour, there was thrown out of the hydrosol a dark green, amorphous sediment which, when dried in a Petri dish in a current of air at room temperature formed an amorphous residue weighing 0.206 gram.

The liquid separated from the sediment obtained after the first hour of centrifugation then was centrifuged again; and this was repeated for two further periods of one hour. The centrifugation sediments obtained after the second, third and fourth hours of centrifugation, when dried, weighed respectively 0.146, 0.089 and 0.030 gram. These sediments each contain the "active pigment units" of our invention.

Separate analyses of the four centrifugation sediments of pigment units thus obtained are set forth below in Table 1.

TABLE 1

| Sediment Number | Pigment | Protein [1] | Lipin [2] |
|---|---|---|---|
| | Per cent | Per cent | Per cent |
| 1 | 23.8 | 70.1 | 6.1 |
| 2 | 27.7 | 64.8 | 7.5 |
| 3 | 37.0 | 56.2 | 6.8 |
| 4 | 17.5 | 75.9 | 6.6 |

[1] Protein determination by Kjeldahl-Nitrogen method. Factor used, N X 6.25.
[2] Lecithin (Lipoid) determination by Carius phosphorus method. Factor used P X 24.3.

The liquid remaining after the fourth hour of centrifugation was heated for one hour at 55° C. to 60° C. and then was subjected to centrifugation, whereupon a flocculent light olive-green precipitate separated out. When dried at low temperature this flocculated cytoplasmic protein weighed 0.34 gram. Freed from the entrained pigment by washing with alcohol, and from the lipoid by means of ethyl ether, a white cytoplasmic protein residue was obtained as a by-product of the method for the extraction of our "active pigment units."

A portion of the chlorophyll hydrosol obtained was also subjected to electrodialysis, as above described.

As the impurities molecularly dissolved were gradually eliminated the chlorophyll hydrosol started to concentrate toward the bottom of the bag and finally produced a sharp demarcation line between the concentrated purified green chlorophyll hydrosol and the supernatant pure water in the sac. After electrodialysis was discontinued, the water layer was pipetted off slowly by means of a capillary attached to suction pump and dried to obtain the active pigment units.

The time necessary for this electrodialysis is in general a function of the type of the hydrosol, the variable nature of proteins—lecithinoids and mineral impurities of the dispersion medium carrying the pigment units as the dispersed phase.

The spinach chlorophyll was electrodialyzed for 8 hours. Analysis of the dry pigment units obtained thereby was:

| 2 | 3 | 1 |
|---|---|---|
| Protein | Lipoid | Pigment |
| Per cent 84.6 | Per cent 0.13 | Per cent 15.27 |

The two methods of extraction and purification of pigment units, namely, fractional centrifugation and electric ultrafiltration (electro-dialysis) described above are based on different principles and therefore the extent of purification achieved is not the same. Similar results, however, may be obtained by empirical adjustment of conditions under which the processes are to be carried out. In fractional centrifugation the cytoplasmic protein is completely removed from the chromoprotein-lipin units carrying the pigment nuclei, while in the electric-ultrafiltration a part of the cytoplasmic protein may be retained in the concentrated chromoprotein hydrosol and this may account for a higher percentage of the protein in units sedimented on drying of the sol. On the other hand, the lipin on electro-dialysis may diffuse out of the sac if molecularly dissolved, and then the lipoid content of pigment units obtained on drying of the concentrated hydrosol is bound to be smaller. The electro-dialysis in itself may be used also in conjunction with, or as a supplementary method to the fractional centrifugation.

We have confirmed that the chlorophyll active pigment units obtained, as above, have substantially the same characteristics as in the original spinach leaves. For this purpose we have treated our active pigment units by methods to obtain the individual components of the units, and we have found that these components have the same characteristics as components obtained using the same methods applied to the fresh spinach leaf itself.

For example, we have treated both our active pigment units and fresh spinach leaves by fractional partition using organic solvents. We have also employed the chromatographic method of selective adsorption and we have also employed a combination of these methods depending upon the individual components involved.

We have also compared the reflectivity R/wave length curves obtained for our active pigment units with those of the corresponding pigments from fresh leaves, as observed by Hardy's electric recording polarization spectro-photometer, and found them to be substantially the same. In addition we have confirmed the identity of extinction/wave length curves for single pigments derived from active pigment units with those obtained otherwise by the method and apparatus of Van den Akker described in Patent No. 2,312,010.

The lipophilic nature of our pigment unit makes them insoluble in water but they have great aptness to peptization in human and animal serum.

In case of medicinal use of the pigment units for injections the pH of the dispersion medium containing them should not greatly differ from the pH of the system into which they are to be introduced. Whether we assume that chlorophyll acts as a pigment, as an absorbent of light or acts chemically and catalytically at the same time its parts in the life cycle depends on its characteristic optical properties. Thus close values obtained for the reflectivity of living leaves and chlorophyll pigment units certainly would underline the existing similarity in their biological and physiological nature and activity, as provide by the Hardy method as mentioned above.

INGREDIENTS OF PIGMENT NUCLEI (a) *Separation of individual pigments from dried "active pigment units" by selective-solvent partition.*—Dry "active pigment units" obtained in the manner above described, were pulverized and dispersed in methanol. This solvent dissolved the pigment and lipoid components of the units, leaving the protein compent substantially undissolved. The protein was filtered off and discarded. The filtrate, containing the pigment and lipoid, was saponified with alcoholic potash to free the pigment from the lipoid fraction. The liquid, after saponification, was incorporated into a mixture of ether and water and the mixture thus obtained was allowed to separate into two layers. The upper ether layer—containing yellow pigments—was mixed with petroleum ether and absolute methanol, followed by addition of water sufficient to dilute the methanol to 80% to 90%. There resulted two layers. Xanthophyll dissolved in the aqueous methanol, from which it was removed by addition of petroleum ether and subsequently crystallized therefrom.

The petroleum ether layer, containing the carotene, was subjected to further treatment with aqueous methanol and petroleum ether in order to effect complete separation of carotene from traces of xanthophyll.

The lower methanol layer, resulting from mixing of the saponified methanol solution of the pigment with ether and water, contained chlorophyll $a$ and chlorophyll $b$. By systematic fractionation of the methanol layer, alternately with 90% methanol and then with petroleum ether, the blue-green chlorophyll $a$ was separated from the yellow-green chlorophyll $b$.

The pigments in dry "active pigment units" obtained from spinach leaves, were separated from the protein and lipoid portions by a modified partition method, as follows: The pulverized pigment units were treated on a filter with a petroleum ether boiling between 30° C. and 60° C. to remove cartene. Repeated elution of the material on the filter with the petroleum ether sufficed to effect complete separation of the carotene.

The carotene-free residue on the filter was then eluted with ethylene chloride to remove the xanthophyll; and the latter in its turn was purified by recrystallization.

The residue still on the filter, and now freed from carotene and xanthophyll, then was eluted with methanol to remove chlorophyll $(a+b)$. The alcohol extract of chlorophyll $(a+b)$ then was subjected to fractional partition with 90% methanol and with petroleum ether, in the manner above described, in order to separate chlorophyll $a$ from chlorophyll $b$.

(b) *Isolation of individual pigments from dried "active pigment units" by chromatographic adsorption.*—Calcium carbonate, previously dried at 150° C., was packed into a glass tube, the lower end of which was pressed against the filtering surface of a fritted glass filter. The filter, in turn, was inserted into a suction flask. On top of the column of calcium carbonate was placed a quantity of dried "active pigment units" obtained from spinach leaves. Under slow suction of a water pump, carbon disulfide was poured in small amounts upon the pigment units. Selective adsorption of the individual components was evidenced by colored zones in the calcium carbonate. From above downwards the zones were (1) yellow (xanthophyll); (2) dark olive green (chlorophyll $b$); (3) dark blue-green (chlorophyll $a$); and (4) two zones respectively yellow and orange-yellow (carotenes). The five zones were separated with a spatula and eluted with solvents specific for the respective pigments.

In a modified chromatographic adsorption, a mixture of three parts of barium carbonate and one part talc was pressed tightly into a tube one-half inch in diameter and seven inches long. The lower end of the glass tube with the column of adsorbent was pressed against the filtering surface of a fritted glass filter in a suction flask. In the upper end of the tube there was a cork through which passed a small separatory funnel containing a solvent consisting of one part petroleum ether and three parts benzene. After the adsorbent in the column had been wet with this solvent, finely pulverized "active pigment units" derived from spinach leaves were placed on the top of the adsorbent. Then the solvent was permitted to fall drop by drop upon the pigment units. The solvent, carrying with it the dissolved pigments, was drawn through the column of adsorbent under slow suction. Colored rings or zones appeared in the adsorbent in the manner above described. The individual pigments thus selectively adsorbed were eluted directly from the respective zones by means of specific, selective solvents.

*Example 2*

Chlorophyll pigment units were produced by starting with the hydrosol of parsley (*Petroselinum sativum*), prepared as in Example 1 by centrifugation. The carrier of chlorophyll is known to be rich in vitamins. Parsley has very small leaves and rather small content of proteins and lipoids, thus a smaller amount of cytoplasmic protein contamination has to be removed. Parsley hydrosol on fractional centrifugation followed by drying was of the same type as those obtained from spinach.

The reflectivity values obtained for chlorophyll from fresh leaves of parsley and those for chlorophyll from active pigment units prepared by the process of the present invention were substantially the same. Other tests as mentioned in Example 1 were employed to further identify the active pigment units from parsley.

*Example 3*

Pigment units, whereof carotene was the pigment component, were prepared in substantially the same manner as that set forth under Example 1; the raw material comprised superficial layers scraped off from carefully washed carrots, the outer portions thereof to a depth of about one-quarter of an inch being used in preparing a hydrosol.

177 grams of the scraped layers of carrot roots were ground in a porcelain mortar with 150 cc. of distilled water. The aqueous portion was separated from the cake by filtration to obtain a beautiful orange, anisotropic hydrosol of carotene. The hydrosol contained 7.4 grams of solids in 120 cc. The carotene, electronegative hydrosol freshly prepared had a pH=6.67. The hydrosol was subjected to fractional centrifugation for four periods of one hour each. The weights of centrifugation sediments after drying and the partition of the respective sediments between pigment protein and lipin are set forth in the following table:

TABLE 2

| Sediment | Weight of Sediment | Pigment | Protein | Lipin |
|---|---|---|---|---|
| | Grams | Per cent | Per cent | Per cent |
| 1 | 0.133 | 53.3 | 30.2 | 16.5 |
| 2 | 0.049 | 57.0 | 21.9 | 21.1 |
| 3 | 0.080 | 60.1 | 24.8 | 15.1 |
| 4 | 0.021 | 21.8 | 53.2 | 25.0 |

The hydrosol remaining after the fourth period of centrifugation was heated to about 55° C. for one hour, and thereafter subjected to centrifugation—yielding a pale orange flocculated cytoplasmic protein, containing a very small fraction of pigment. This protein after drying, weighed 0.093 gram. The protein then was freed from contaminating pigment and lipin as described above under Example 1. Similar tests on the carotene active pigment units so obtained confirmed that they were substantially the same as those in the natural fresh carrots.

From a representative sample of centrifugation sediments—obtained from scraped carrots as already described—xanthophyll was first removed by ethylene chloride and methanol. The crude carotene was partitioned into its alpha and beta isomers by means of selective adsorption on a mixture of equal weights of magnesium oxide and a siliceous earth (Hyflo Super Cel). The beta-carotene was readily adsorbed; whereas the alpha-carotene passed through the adsorption column and thereafter was concentrated under vacuum and crystallized. The beta-carotene was separated from the adsorbent by elution with petroleum ether and ethanol, from which it was subsequently isolated and later recrystallized from ether and ethanol in the form of small orange and orange-red rhombic plates.

*Example 4*

In a similar manner pigment units comprising lycopene, chromoprotein and lipin were obtained from tomato skins prepared in accordance with Example 1. Analysis of a sample of the lycopene-containing active pigment units gave protein, 25.4%, lipin 10.5%, and lycopene, 64.1%. Tests showed these to be substantially the same as those in the fresh tomato.

The "active pigment units" were extracted with benzene, and the benzene solution was passed through a column of the same adsorbent as was used in the separation of beta-carotene from carotene-containing pigment units. Beta-carotene passed through the column unadsorbed; while the lycopene was adsorbed thereby. The lycopene was eluted from the adsorbent with benzene and ethanol or with petroleum ether and ethanol. By later recrystallization from benzene, ether, and acetone, lycopene crystals were obtained as long, narrow, red-yellow needles or star-like clusters.

In the above examples, the preparation of the dispersion is prepared as above stated, by grinding spinach leaves, carrots or other suitable material by a mortar and pestle. Under such circumstances the colloidal electrolyte system which already exists in the plant will be freed from the cellulose and will become further dispersed by the water. Accordingly, if the above process is carried out, or manufacturing conditions are similarly controlled, there will be substantially no colloidal cellulose in the resulting electrolyte dispersion. However, if a pebble mill is employed, for example, in grinding the spinach leaves, carrots or other suitable substances, and such grinding is carried out for a sufficient length of time, or under conditions such as to render the cellulose in a sufficiently finely ground condition, then according to the length of time of such grinding, more or less of such cellulose will probably be produced as a colloidal dispersion and will pass into the colloidal electrolyte solution.

Although the above examples describe the addition of distilled water to the material treated, if the plant contain sufficient natural or other water, such addition may be unnecessary.

THE USE OF CHLOROPHYLL ACTIVE PIGMENT UNITS

I. The dietetic as well as therapeutical significance of our active pigment units is largely due: (1) to the natural, unaltered amorphous and physiologically potent state of the pigment. (2) To the possibility of administering directly the pigment units in acidproof capsules, so they reach the place of adsorption substantially chemically intact, so as to act in status nascendi with their full potential activity. (3) To the high concentration of chlorophyll in a small dosage. (4) To the high adsorption ability because of least amount of contamination. (5) To the preservation in an oxy- and photostable state of such units. (6) To the ability to use them intravenously as colloidally dispersed or peptized as wet pigment units in human or animal plasma.

Being highly concentrated in the colorant matter and having the least amount of contaminations the pigment units as we extract them are suitable for extraction of pure crystalline single components of the pigment nuclei in a more economical way, without expensive processing. Chromoproteins and cytoplasmic proteins may be extracted in this process as by-products.

Pigment units or pigment nuclei derived therefrom may be used as non-toxic food colorants.

Pigment units of chlorophyll may be used as catalysts in oxidation processes such as conversion of semi-drying oils into quick drying.

We believe that the catalytic action of our active pigment units as present in plants is responsible for photo-synthesis, the furthering of oxidation and reduction processes of plant cells and the metabolism of the cells in general. In this unit the pigment is protected from oxidation and action of light by proteins and lipoids of the unit. The pigments proteins and lipoids, are not injured during the process of separation. The units produced by the new method do not show any disintegration or alteration during a period of 18 months.

If the units of chlorophyll are given per os and protected by special acid resistant gelatin capsules from action of the acid of the stomach and the pepsin and trepsin enzymes of the upper gastro-intestinal tract they will reach the absorption part of the lower intestinal tract without material disintegration.

The most important possible use of chlorophyll is as a catalyst that furthers oxidation processes in the cells. The slowing down of the oxidation processes in the animal cells is responsible for all degenerative processes that are laways present in aging animal or individual. Where a young man of 25 to 30 may burn up food fully the individual of 30, 40 or 50 burns up food with a deficiency of 10%, 15%, 20%, 25%, etc., depending on origin, race, sex, etc. By preserving and introducing into the animal cell the oxidation catalyst, chlorophyll, we can improve this ratio.

The decline in oxidation ratio causes a slow and protracted intoxication of the body with the toxic products resulting from faulty oxidation. These toxic products are carried away from the cells through lymphatic channels and later through the blood vessel system. The toxic products carried away by the blood stream, in turn, cause changes in the intima cells of the vessel.

Cholesterin, a product resulting from faulty oxidation of fats, is known to be one of the causes of arterio-sclerosis.

Rabbits, especially male rabbits, fed toxic doses of cholesterin will artificially develop arterio-sclerosis. To prove the action of chlorophyll to offset arterio-sclerosis, two groups of rabbits were used for experimental purposes. The first group was given toxic doses of cholesterin without chlorophyll active pigment units. The second control group of rabbits was given simultaneously the same toxic doses of cholesterin plus injections of chlorophyll active pigment units. Autopsy of the first group showed definitely arterio-sclerotic plaques whereas the second group did not show changes in the intima. This is due to the increased metabolism and improved oxidation in the cells, helping the cells to burn up the introduced toxic material.

PREVENTIVE AND THERAPEUTIC ACTION OF CHLOROPHYLL

1. *Preventive.*—(a) Prevention of arterio-sclerosis if given as a preventive when the animal or human body slows down the oxidation processes during the aging period.

(b) By preventing arterio-sclerosis simultaneously preventing the deterioration of the glands of internal secretion, such as ovaries, testicles, pancrease, adrenal glands, etc. The specific glandular function of these glands so important for the general welfare and normal function of the body is dependent on the adequate supply of blood to the cells. Arterio-sclerosis of the vessels, obstructing and narrowing the vessels, gradually diminishes the blood supply to those very sensitive cells and causes deterioration and necrosis of the glandular cells responsible for specific action. Gradual sclerosis of these organs, with increase of the connective tissue and decrease of the specific glandular tissues, is responsible for retrogressive changes in the body. Sclerosis of the ovaries and testicles will cause male and female climacterium. Sclerosis of the pancreas and liver will cause diabetes. Sclerosis of the adrenal glands will cause high blood pressure, etc.

(c) Prevention of high blood pressure due to arterio-sclerosis of the kidney vessels (glomeruli).

(d) Prevention of non-infectious type of myocarditis, due to improper supply of blood to the heart muscles.

(e) Prevention of dementia-senilis, loss of memory, the slowing down of mental processes, and cerebral hemorrhage which occur as a result of arterio-sclerotic changes in the vessels of the brain.

2. *Therapeutic.*—(a) Stimulation of the haemopoetic system, such as bone marrow, liver and spleen.

(b) General stimulation of the oxidation processes of all cells of the body with resulting tonicizing effect; stimulation of granulation of tissue in healing of wounds.

(c) Restoration of the normal metabolism processes in nerve cells of the brain due to the stimulation of the oxidation processes and specifically in cases of battle fatigue, shell shock, nervous exhaustion, which have been caused by the slowing down of the processes in the cells as a result of nervous exhaustion.

CHLOROPHYLL AND CAROTENE UNITS AND THEIR IMPORTANCE AS PRECURSORS OF VITAMIN "A"

Chlorophyll and carotene in pure form (chlorophyll and carotene active pigment units) are precursors of vitamin "A." In other words, chlorophyll active pigment units which contain as an integral part, carotene, or carotene contained in the carotene active pigment units, should be given in preference to vitamin "A" produced by different animals. Vitamin $A_1$ and vitamin $A_2$ produced by carotenase of the liver cells of sharks, whales and cod are different from vitamin "A" produced by carotenase of the human liver. The logical and most effective way is to allow each species to produce its own specific vitamin "A" from its precursor, carotene as obtained in our active pigment units.

BY-PRODUCTS OF THE UNITS

Pure chromoproteins and cytoproteins and lipoids, freed from cellulose covering, can be used as a by-product for their food value, or for medical application in infectious processes for non-specific treatment by subcutaneous injections.

We claim:

1. A process for producing substantially oxy- and photo-stable active pigment units from raw material of plant origin which comprises (a) comminuting fresh raw plant material to substantially colloidal size and adding water to form a hydrosol therefrom of substantially undecomposed colloidal dispersoids containing pigment, protein and lipin, (b) removing some extraneous matter therefrom leaving a hydrosol containing substantially only such colloidal dispersoids, (c) separating said colloidal dispersoids constituting active pigment units from the dispersion medium containing remaining extraneous material, and (d) drying said dispersed colloids under conditions to avoid decomposition, to substantially complete dryness.

2. The process as defined in claim 1, wherein step (c) comprises subjecting the hydrosol to electro-dialysis, whereby to separate active pigment units.

3. A process for producing substantially oxy- and photo-stable active pigment units from raw material of plant origin which comprises (a) comminuting fresh raw plant material to substantially colloidal size and adding water to form a hydrosol therefrom of substantially undecomposed colloidal dispersoids containing pigment, protein and lipin, (b) filtering the hydrosol to remove some extraneous matter leaving a hydrosol containing substantially only such colloidal dispersoids, (c) separating said colloidal dispersoids from the dispersion medium containing remaining extraneous matter, and (d) drying said colloidal dispersoids to substantially complete dryness under suitable temperature and other conditions to avoid decomposition, to secure active pigment units therefrom.

4. A process which comprises (a) comminuting fresh raw plant material to substantially colloidal size and adding water to form a hydrosol therefrom of substantially undecomposed colloidal dispersoids containing pigment, protein and lipin, (b) removing some extraneous matter therefrom leaving a hydrosol containing substantially only such colloidal dispersoids, (c) separating from the dispersion medium containing remaining extraneous matter, said colloidal dispersoids in the form of amorphous pigment units having pigment nuclei enclosed within protective layers of lipin and protein, and (d) drying said pigment units under conditions to avoid decomposition to substantially complete dryness.

5. A process which comprises (a) comminuting fresh raw plant material to substantially colloidal size and adding water to form a hydrosol therefrom of substantially undecomposed colloidal dispersoids containing pigment, protein and lipin, (b) removing some extraneous matter therefrom leaving a hydrosol containing substantially only such colloidal dispersoids, (c) separating from the dispersion medium containing remaining extraneous matter, said colloidal dispersoids in the form of amorphous pigment units having chlorophyll pigment nuclei enclosed within protective layers of lipin and protein, and (d) drying said pigment units under conditions to avoid decomposition to substantially complete dryness.

6. A process which comprises (a) comminuting fresh raw plant material to substantially colloidal size and adding water to form a hydrosol therefrom of substantially undecomposed colloidal dispersoids containing pigment, protein and lipin, (b) removing some extraneous matter therefrom leaving a hydrosol containing substantially only such colloidal dispersoids, (c) separating from the dispersion medium containing remaining extraneous matter, said colloidal dispersoids in the form of amorphous pigment units having carotene pigment nuclei enclosed within protective layers of lipin and protein, and (d) drying said pigment units under conditions to avoid decomposition to substantially complete dryness.

7. The process defined in claim 1 wherein step (c) comprises subjecting the hydrosol to centrifugation whereby to separate active pigment units.

8. A process of preparing active pigment units from plant material without the addition of organic solvents or electrolytes injurious to said units, which comprises (a) comminuting fresh raw plant material to substantially colloidal size whereby a hydrosol is formed therefrom of substantially undecomposed colloidal dispersoids containing pigment, protein and lipin, (b) removing some extraneous matter therefrom leaving a hydrosol containing substantially only such colloidal dispersoids, (c) separating from the dispersion medium containing extraneous matter, said colloidal dispersoids in the form of amorphous pigment units having pigment nuclei enclosed within protective layers of lipin and protein, and (d) drying said pigment units under conditions to avoid decomposition to substantially complete dryness.

SOPHIA S. BERKMAN.
BORIS S. BERKMAN.

REFERENCES CITED

The following references are of record in the file of this patent:

UNITED STATES PATENTS

| Number | Name | Date |
| --- | --- | --- |
| 1,295,943 | Welch | Mar. 4, 1919 |
| 2,115,815 | Johnson | May 3, 1938 |
| 2,131,394 | Test | Sept. 27, 1938 |
| 2,170,872 | Peebles | Aug. 29, 1939 |
| 2,216,174 | Guthrie | Oct. 1, 1940 |
| 2,242,062 | Evertz | May 13, 1941 |

FOREIGN PATENTS

| Number | Country | Date |
| --- | --- | --- |
| 9,565 | Great Britain | 1915 |
| 730,473 | Germany | Jan. 12, 1943 |

OTHER REFERENCES

"National Dispensatory" by Stille et al., 5th ed. (Lee Bros., Phila., 1896), pp. 635–637.